United States Patent
Campbell et al.

(10) Patent No.: US 9,330,198 B1
(45) Date of Patent: May 3, 2016

(54) MAPPING STORED CLIENT DATA TO REQUESTED DATA USING METADATA

(71) Applicant: Amazon Technologies, Inc., Reno, NV (US)

(72) Inventors: Brad Lee Campbell, Seattle, WA (US); Daniel W. Hitchcock, Seattle, WA (US); Owen G. Griffiths, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 13/679,254

(22) Filed: Nov. 16, 2012

(51) Int. Cl.
*G06F 17/30* (2006.01)

(52) U.S. Cl.
CPC .................................. *G06F 17/30914* (2013.01)

(58) Field of Classification Search
CPC ............ G06F 21/10; G06F 2221/2111; G06F 17/30539; G06F 21/64
See application file for complete search history.

(56) References Cited

U.S. PATENT DOCUMENTS

| | | | | |
|---|---|---|---|---|
| 6,144,988 A | * | 11/2000 | Kappel | H04L 63/0421 709/202 |
| 7,698,170 B1 | * | 4/2010 | Darr et al. | 705/26.35 |
| 7,720,720 B1 | * | 5/2010 | Sharma et al. | 705/26.7 |
| 8,209,549 B1 | * | 6/2012 | Bain, III | 713/193 |
| 2003/0135482 A1 | * | 7/2003 | Takahashi et al. | 707/1 |
| 2004/0036718 A1 | * | 2/2004 | Warren et al. | 345/744 |
| 2007/0118394 A1 | * | 5/2007 | Cahoon | 705/1 |
| 2011/0145049 A1 | * | 6/2011 | Hertel et al. | 705/14.23 |
| 2012/0054095 A1 | * | 3/2012 | Lesandro et al. | 705/39 |
| 2012/0158526 A1 | * | 6/2012 | Cosman | 705/14.73 |

FOREIGN PATENT DOCUMENTS

WO 2013170374 11/2013

\* cited by examiner

*Primary Examiner* — Angelica Ruiz
(74) *Attorney, Agent, or Firm* — Thomas | Horstemeyer, LLP (57) ABSTRACT

Disclosed are various embodiments that employ metadata to map stored client data to form fields and other data consumers. Data items are requested by a data consumer, such as a form. Metadata is obtained that includes a mapping of stored data items to the requested data items, and the mapping is associated with an identification of the data consumer. The requested data items are provided to the data consumer based at least in part on the mapping and the stored data items.

23 Claims, 6 Drawing Sheets

MAPPING STORED CLIENT DATA TO REQUESTED DATA USING METADATA

BACKGROUND

Forms may be present in many user interfaces, including network pages, mobile applications, locally executed applications, and so on. Forms are designed for manual input of data by users. Form field types may include text fields, text area fields, checkboxes, radio buttons, drop-down boxes, sliders, and other types. Forms may be employed for users to perform actions relative to network sites, e.g., logging in, registering for an account, placing an order, adding items to shopping lists, and so on.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the use of metadata to map stored client data to form input fields on network pages, mobile application screens, and other user interfaces. Repeatedly filling in form fields with commonly requested information such as name, address, phone number, email address, etc., can be aggravating to users. Browsers may provide an ability to save data supplied to a particular form, but such information may not be provided to different forms associated with different applications or network sites. Form field names and data formats are often arbitrarily chosen by developers and differ from form to form. In some cases, browsers or other applications may attempt to automatically fill in different forms using stored data. However, such form filling would be non-deterministic and cannot guarantee that the stored data will be provided to the correct form fields and in the correct format.

As a non-limiting example, a user may enter an example "birth_date" as "Jan. 1, 2000" in a particular form field of a first form on a network page. The browser may store this information. Suppose that a second form is encountered on a different network page, and the second form includes a field named "birthdate." The browser may correctly guess that "birthdate" corresponds to "birth_date," but the browser may not be able to determine the date format the second form is expecting. The browser may attempt to fill in "Jan. 1, 2000" in the "birthdate" field, but the second form may be expecting the date in the format "1 Jan. 2000." Various logic may be built into the browser to handle a variety of form filling situations, but the browser remains unable to handle every situation that may arise in a deterministic manner.

Various embodiments of the present disclosure employ metadata that maps form fields to stored data to facilitate deterministic form filling. The metadata may go beyond the simple mapping of data items and include transformations, combinations of multiple data items, regular expressions, and other features. The metadata may be obtained from a central authority, a network site hosting the form, the user, and/or other sources. Such metadata may be manually created by form owners, agents of a central authority, or others. In some embodiments, the metadata may be crowdsourced.

Figure 1:
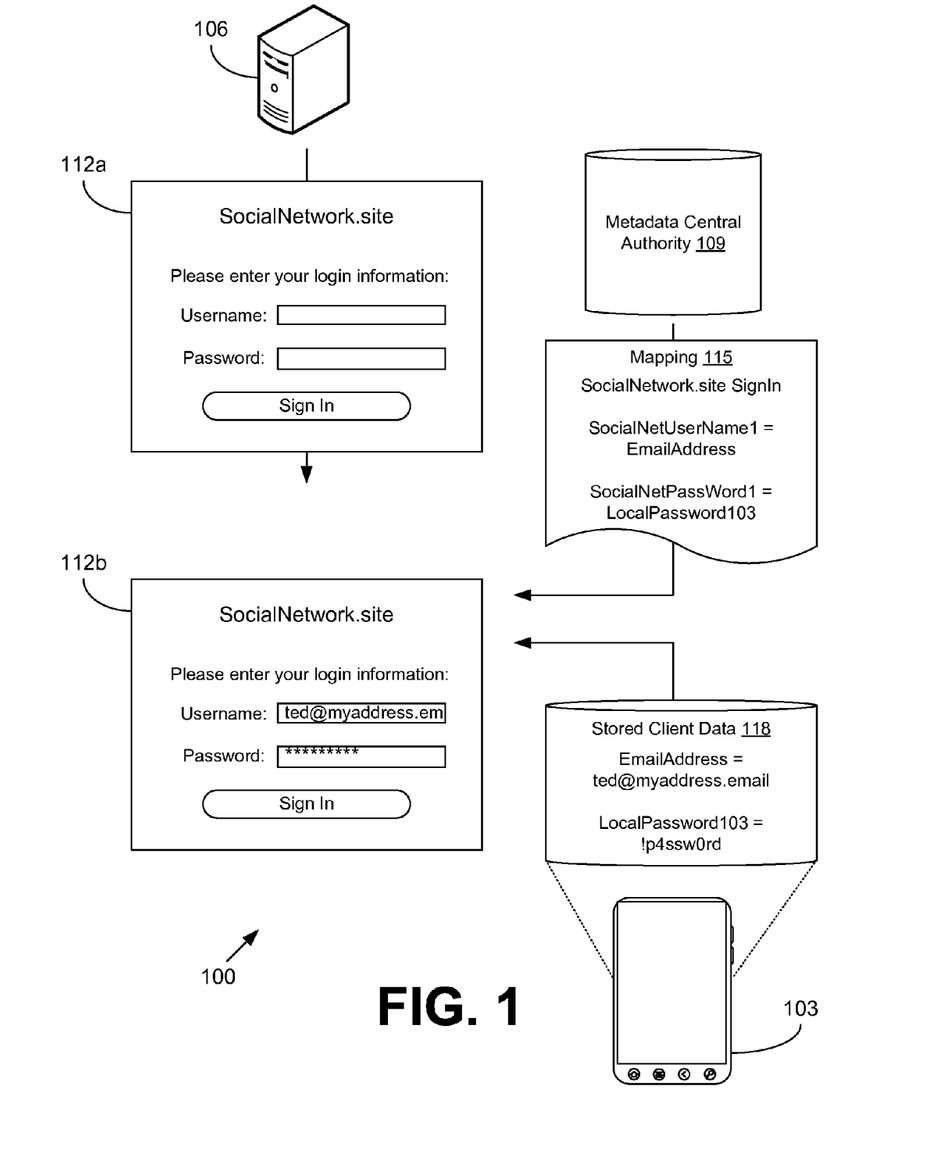
FIG. 1 is a drawing that depicts an example scenario in a networked environment according to various embodiments of the present disclosure.

With reference to FIG. 1, shown is a drawing that depicts an example scenario in a networked environment 100 according to various embodiments. The networked environment 100 includes a client 103, a server 106, and a metadata central authority 109. To begin, a client 103 renders a user interface 112a that includes a form having data fields for username and password. Such a user interface 112a may be a network page, mobile application screen, etc. and may be rendered based at least in part on data obtained from the server 106 over a network. The client 103 may then obtain metadata from the metadata central authority 109. The metadata includes a mapping 115 that corresponds to the form.

The mapping 115 defines a correspondence between requested data of the user interface 112a and stored client data 118 in the client 103. For example, the username field in the user interface 112a may have a name of "SocialNetUserName1," and the password field in the user interface 112a may have a name of "SocialNetPassWord1." The mapping 115 indicates that "SocialNetUserName1" corresponds to the stored data named "EmailAddress" and that "SocialNetPassWord1" corresponds to the stored data named "LocalPassword103." As shown in FIG. 1, the stored client data 118 named "EmailAddress" corresponds to the value "ted@myaddress.email," and the stored client data 118 named "LocalPassword103" corresponds to the value "!p4ssw0rd."

Based at least in part on the mapping 115 obtained from the metadata central authority 109 and the stored client data 118, the client 103 is configured to automatically fill in the fields of the user interface 112a, which is reflected in the user interface 112b. If stored data is not available to supply requested data, the client 103 may render another user interface to elicit the non-stored requested data from the user. Although the client 103 may automatically fill in a form as shown in FIG. 1, it is understood that the client 103 may instead supply such stored client data 118 via application programming interfaces (APIs), remote service requests, and other backend approaches. In the following discussion, a general description of the system and its components is provided, followed by a discussion of the operation of the same.

Figure 2:
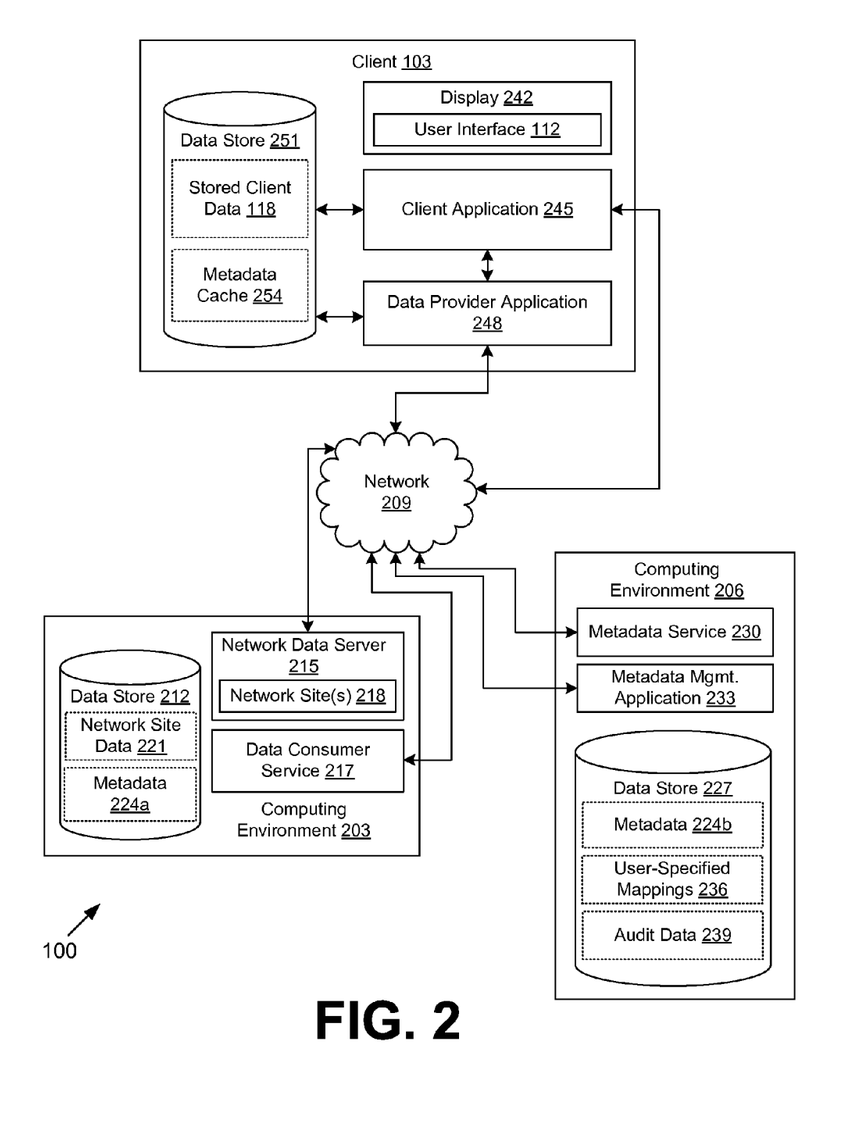
FIG. 2 is a drawing of a detail view of the networked environment of FIG. 1 according to various embodiments of the present disclosure.

With reference to FIG. 2, shown is a detail view of the networked environment 100 (FIG. 1) according to various embodiments. The networked environment 100 includes the client 103, a computing environment 203, and a computing environment 206 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may correspond to the server 106 (FIG. 1), and the computing environment 206 may correspond to the metadata central authority 109 (FIG. 1). The computing environments 203, 206 may each comprise, for example, a server computer or any other system providing computing capability. Alternatively, the computing environments 203, 206 may each employ a plurality of computing devices that may be employed that are arranged, for example, in one or more server banks or computer banks or other arrangements. Such computing devices may be located in a single installation or may be distributed among many different geographical locations. For example, the computing environments 203, 206 may each include a plurality of computing devices that together may comprise a cloud computing resource, a grid computing resource, and/or any other distributed computing arrangement. In some cases, the computing environments 203, 206 may each correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a network data server 215, a data consumer service 217, and other applications, services, processes, systems, engines, or functionality not discussed in detail herein. The network data server 215 is executed to serve up network content to clients 103 via the network 209. The network data server 215 may employ protocols such as, for example, hypertext transfer protocol (HTTP), simple object access protocol (SOAP), real-time transport protocol (RTP), representational state transfer (REST), and other protocols. For example, the network data server 215 may host one or more network sites 218, which may correspond to web sites, gopher sites, mobile application data providers, and others. The network data server 215 may correspond to a commercially available HTTP server such as, for example, Apache® HTTP Server, Apache® Tomcat®, Microsoft® Internet Information Services (IIS), and so on. The network data server 215 may be configured to serve up forms and to receive form data via HTTP "GET," HTTP "POST," HTTP "PUT," and/or other approaches.

The data consumer service 217 is executed to receive requested data from clients 103. The requested data may correspond to hypertext markup language (HTML) form data and/or other formats of requested data. In some embodiments, the submission of requested data to the data consumer service 217 may not involve forms or active user browsing on a network site 218. The data consumer service 217 may employ protocols such as, for example, hypertext transfer protocol (HTTP), simple object access protocol (SOAP), real-time transport protocol (RTP), representational state transfer (REST), remote method invocation (RMI), remote procedure call (RPC), and other protocols.

The data stored in the data store 212 includes, for example, network site data 221, metadata 224a, and potentially other data. The network site data 221 includes various data pertaining to the network sites 218, including, for example, code, templates, text, images, HTML data, extensible markup language (XML) data, video, audio, and so on. The metadata 224a includes a mapping 115 (FIG. 1) of requested data to stored client data 118 (FIG. 1) for one or more data consumers hosted by the computing environment 203. Such data consumers may correspond to the network data server 215, various form processing engines hosted by the network data server 215, the data consumer service 217, and other data consumers in the computing environment 203. The metadata 224a may include transformations to be applied to stored client data 118, combinations of stored client data 118, regular expressions to validate stored client data 118, and other content used to map stored client data 118 to data requested by the computing environment 203. The metadata 224a may indicate that some requested data items are required while others are optional.

Various applications and/or other functionality may be executed in the computing environment 206 according to various embodiments. Also, various data is stored in a data store 227 that is accessible to the computing environment 206. The data store 227 may be representative of a plurality of data stores 227 as can be appreciated. The data stored in the data store 227, for example, is associated with the operation of the various applications and/or functional entities described below.

The components executed on the computing environment 206, for example, include a metadata service 230, a metadata management application 233, and other applications, services, processes, systems, engines, or functionality not discussed in detail herein. The metadata service 230 is executed to serve up metadata 224 in response to requests by clients 103. The computing environment 206 and the metadata service 230 may correspond to a metadata central authority 109 (FIG. 1). As a central authority, the metadata service 230 may serve up metadata 224 for a variety of network sites 218 and data consumer services 217, potentially with no relationship defined between the entity operating the network sites 218 or data consumer services 217 and the entity operating the metadata service 230. The metadata service 230 may employ protocols such as, for example, hypertext transfer protocol (HTTP), simple object access protocol (SOAP), real-time transport protocol (RTP), representational state transfer (REST), remote method invocation (RMI), remote procedure call (RPC), and other protocols.

The metadata management application 233 may be executed to manage updates to the metadata 224. Such updates may originate from users via a crowdsourcing approach, from owners of the network sites 218 or data consumer services 217, from independent contractors compensated on a per-task basis, from agents of the metadata central authority 109, or from other sources. The metadata management application 233 may generate various user interfaces that are sent to clients 103 to facilitate creating or updating metadata 224. The metadata management application 233 may also facilitate verification and auditing of updates to metadata 224 submitted by untrusted sources.

The data stored in the data store 227 includes, for example, metadata 224b, user-specified mappings 236, audit data 239, and potentially other data. The metadata 224b corresponds to metadata 224 stored by the data store 227 of the computing environment 206. The metadata 224b includes a mapping 115 of requested data to stored client data 118 for a variety of data consumers. The metadata 224b may include transformations to be applied to stored client data 118, combinations of stored client data 118, regular expressions to validate stored client data 118, and other content used to map stored client data 118 to data requested by data consumers.

The user-specified mappings 236 correspond to mappings 115 specified by users. Such user-specified mappings 236 may be crowdsourced from a multitude of users at clients 103. For example, a user may indicate that a requested form field of a network site 218 corresponds to a standardized field in the stored client data 118 such as "FirstName." The user-specified mappings 236 may be pending verification by the metadata management application 233 before they are incorporated in publically available metadata 224b.

The audit data 239 corresponds to data associated with manual audits or verifications of the user-specified mappings 236 or other mappings 115 obtained from untrusted sources such as automated generation tools, untrusted agents, and so on. The audit data 239 may determine whether multiple mappings 115 agree and therefore may be acceptable, or whether multiple mappings 115 disagree and therefore may be unacceptable. The audit data 239 may control audits that may occur on a periodic basis. For example, a mapping 115 may be automatically audited from time to time to determine that the particular form on a network site 218 is still requesting the same data items that are included in the mapping 115. If the form requests additional or different data items, the existing mapping 115 may be invalidated and a new or modified mapping 115 may be created through the metadata management application 233.

The client 103 is representative of a plurality of client devices that may be coupled to the network 209. The client 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 103 may include a display 242. The display 242 may comprise, for example, one or more devices such as liquid crystal display (LCD) displays, gas plasma-based flat panel displays, organic light emitting diode (OLED) displays, LCD projectors, or other types of display devices, etc.

The client 103 may be configured to execute various applications such as a client application 245, a data provider application 248, and/or other applications. Also, various data is stored in a data store 251 that is accessible to the computing environment 206. The data store 251 may be representative of a plurality of data stores 251 as can be appreciated. The data stored in the data store 251, for example, is associated with the operation of the various applications and/or functional entities described below.

The client application 245 may be executed in a client 103, for example, to access network content served up by the computing environment 203 and/or other servers, thereby rendering a user interface 112 on the display 242. The client application 245 may, for example, correspond to a browser, a mobile application, etc., and the user interface 112 may correspond to a network page, a mobile application screen, etc. The data provider application 248 is used to store various data items obtained from the users of the client 103 (including standardized data items and potentially non-standard data items), to obtain metadata 224, and to provide stored data items to data consumers based at least in part on the mappings 115 obtained in the metadata 224.

In one embodiment, the data provider application 248 is a plug-in or extension of the client application 245. The data provider application 248 may be configured to fill in forms in various user interfaces 112 rendered by the client application 245. Alternatively, the data provider application 248 may provide data to the data consumers via a backend process. If requested data is unavailable from the stored data items, the data provider application 248 may be configured to obtain the unavailable data from the user via one or more user interfaces 112. The client 103 may be configured to execute applications beyond the client application 245 and the data provider application 248 such as, for example, other browsers, other mobile applications, email applications, social networking applications, and/or other applications.

The data stored in the data store 251 includes, for example, stored client data 118, a metadata cache 254, and potentially other data. The stored client data 118 may be generated through the operation of the data provider application 248. In some cases, the data provider application 248 may automatically obtain and store data in the stored client data 118 as the users fill in forms. In other cases, the user at the client 103 may be prompted to provide missing stored client data 118 in advance or on demand as needed. The metadata cache 254 may be employed to store metadata 224a obtained from the computing environment 203 and/or metadata 224b obtained from the computing environment 206 as the case may be.

Next, a general description of the operation of the various components of the networked environment 100 is provided. To begin, a user at a client 103 may create various stored client data 118 through the data provider application 248. For example, the user may launch the data provider application 248 and provide various types of standardized data items, such as first name, last name, email address, street address, city, zip code, gender, age, birthdate, and so on. Data item types may be considered to be "standardized" when they correspond to a preconfigured collection of data item types in the data provider application 248. It is noted that such data item types correspond to specific data rather than generic types such as text input or button input. As an alternative to providing standardized data in advance, the user may provide such data items to the data provider application 248 in conjunction with filling out forms in user interfaces 112 rendered by the client application 245. The data may be learned automatically as the user manually fills in the form or the data may be elicited from the user by the data provider application 248 in order for the data provider application 248 to provide the data to the data consumer.

The user at the client 103 may employ the client application 245 to interact with various network sites 218. In so doing, the network data server 215 may send data encoding user interfaces 112 to the client 103 by way of the network 209. Such user interfaces 112 may request various data items from the client 103, e.g., by way of a form or other approach. The data provider application 248 then obtains metadata 224 that corresponds to the form or other data consumer.

Such metadata 224 may be obtained through several different approaches in various embodiments. In some cases, the metadata 224 may be embedded or otherwise linked to the network data sent by the network data server 215. In other words, the metadata 224 may correspond to the metadata 224a hosted by the computing environment 203. Such metadata 224a may be embedded within a network page document or may be obtained separately from the network data server 215.

In other cases, the metadata 224 may be obtained from a metadata central authority 109 through a request by the data provider application 248 to the metadata service 230 via the network 209. The data provider application 248 may request the metadata 224b from the metadata service 230 by identifying the data consumer that has requested data from the user. For example, the data provider application 248 may request the metadata 224b by providing the domain name of the network site 218 that is requesting data, by providing a uniform resource locator (URL) or other identifier of the data consumer service 217, or by other approaches. In some cases, the metadata service 230 may be configured to push metadata 224b to the client 103 before the metadata 224b is used.

In some cases, the metadata 224 may be obtained from a metadata cache 254 in the client 103. If the metadata 224 is obtained from a metadata cache 254, the data provider application 248 may be configured to verify that the metadata 224 is current and valid. For example, the data provider application 248 may issue a request to an originator of the metadata 224 to determine whether a timestamp, version, or other signature associated with the metadata 224 is current. If the metadata 224 is not current, the data provider application 248 may obtain updated metadata 224 from the computing environment 203 or the computing environment 206 as described previously. In other cases, the metadata 224 may be included with the data provider application 248.

Once the appropriate metadata 224 is available, the data provider application 248 employs the included mapping 115 to determine stored client data 118 that corresponds to the data items requested by the form or other data consumer. To this end, the data provider application 248 correlates an identifier of a requested data item with an identifier in the mapping 115 to determine a corresponding identifier of data in the stored client data 118. The mapping 115 may define the requested data item as corresponding to a combination of multiple stored data items. As a non-limiting example, the mapping 115 may defined a requested mailing address as being a combination of a stored street address, a stored city, a stored state, and a stored zip code.

Also, the mapping 115 may define the requested data item as correspond to a transformation of one or more stored data items. Various operations may be employed in a transformation, e.g., an uppercasing operation, a lowercasing operation, a substring operation, and so on. As a non-limiting example, the mapping 115 may define a requested credit card number as being four-digit groupings of digits from a stored credit card number, where the four-digit groupings are separated by spaces. As another non-limiting example, the mapping 115 may define a requested name as being a stored first name and a stored last name concatenated with a space, with an uppercasing operation being applied to the result.

Further, the mapping 115 may define a regular expression or other requirements for requested data. For example, the mapping 115 may define a data format as being all numeric, all lowercase, containing four digits, all alphanumeric, alphanumeric containing at least one number, containing at least one special character, and so on. The stored data may be evaluated against the regular expression or other requirements. If the corresponding stored data is determined to be non-conforming, the data provider application 248 may render a user interface 112 to prompt the user to provide conforming data.

It may be the case that the requested data is not available in the stored client data 118 or that explicit user permission is needed for providing the stored client data 118 to a data consumer. In such cases, the data provider application 248 may render a user interface 112 to prompt the user to provide the requested data and/or to provide permission to share the requested data. The data provider application 248 may allow the user to save the data that is provided under a user-provided or standardized name/identifier. Such data may then be automatically provided upon future requests by the data consumer.

In some scenarios, data cannot be saved or filled in automatically. For example, with a completely automated public Turing test to tell computers and humans apart (CAPTCHA) or other challenge-response test, input from the actual user may be required. With a CAPTCHA, the user may be prompted to fill in the requested data in the form rendered by the client application 245. Alternatively, the data provider application 248 may render a different user experience to present the CAPTCHA to the user and to obtain the response of the user to the CAPTCHA. For example, the user experience may show an image or play audio from the CAPTCHA. The user may be requested to transcribe the audio or image in a form field. Upon the user providing the transcription, the data provider application 248 may then send the result to the data consumer.

In response to the requested data being gathered, either from user input or from stored client data 118, the data provider application 248 then prepares the data to be provided to the data consumer. In so doing, the data provider application 248 may generate the requested data by applying transformations, combinations, etc. to the gathered data. The data provider application 248 then provides the data to the data consumer. This may be done by form filling or through a backend process. With a backend process, the data provider application 248 may communicate with the network data server 215 and/or the data consumer service 217 over the network 209 to submit the requested data via an API without the user at the client 103 perceiving a form being filled in and submitted.

As has been described, requested data may be provided to data consumers based at least in part on metadata 224. The metadata management application 233 may provide functionality to facilitate creation of the metadata 224 and the mappings 115. To this end, the metadata management application 233 may generate data encoding various user interfaces 112, e.g., in network pages or in mobile application data, and send the data to clients 103 for rendering in the client application 245. In some cases, the data provider application 248 may generate portions of user interfaces 112 to assist in creation of mappings 115 as will be discussed in connection with FIG. 3.

Figure 3:
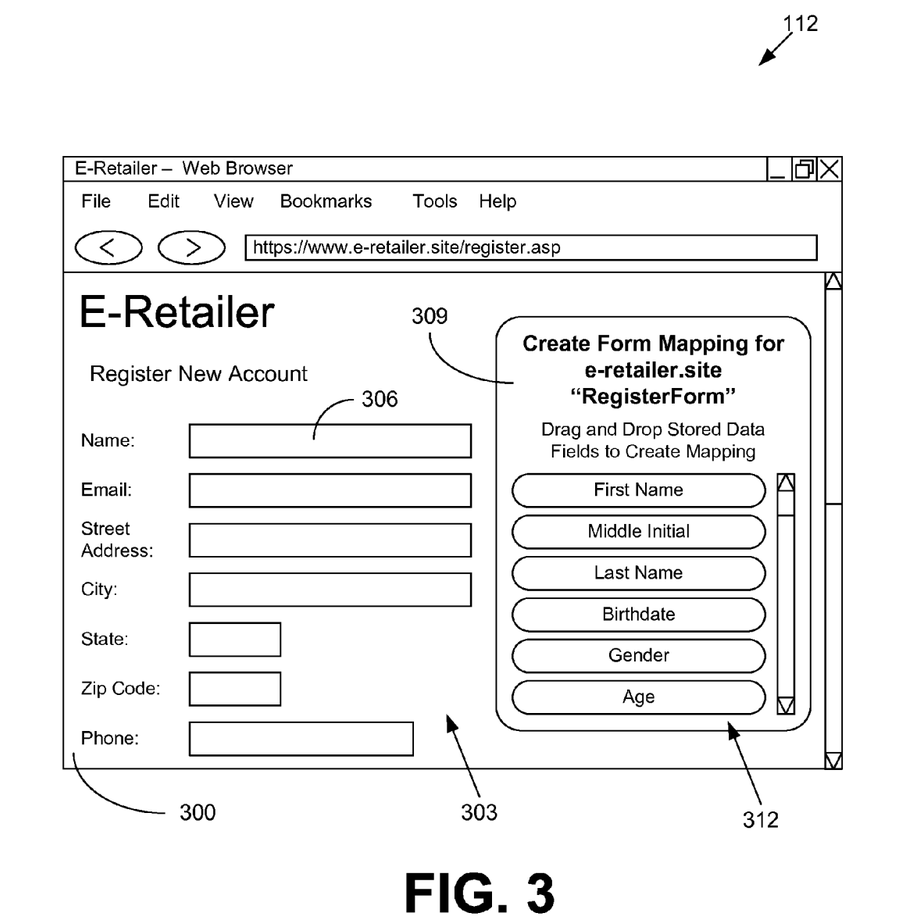
FIG. 3 is a drawing of an example of a user interface rendered by a client in the networked environment of FIG. 1 according to various embodiments of the present disclosure.

Turning now to FIG. 3, shown is one example of a user interface 112 rendered in a client 103 (FIG. 1) in the networked environment 100 (FIG. 1). At least a portion of the user interface 112 may be rendered by a data provider application 248 (FIG. 2) to facilitate specification of mappings 115 (FIG. 1). In FIG. 3, the user interface 112 shows a network page 300 rendered by the client application 245 (FIG. 2).

The network page 300 includes an account registration form 303 for a network site 218 (FIG. 2). The account registration form 303 includes multiple form fields 306 relating to name, email address, street address, city, state, zip code, phone, and so on. Internally in the code for the network page 300, each of these form fields 306 may be associated with a name or identifier, such as "RegForm.Name," "RegForm.Email," "RegForm.StreetAddress," "RegForm.City," "RegForm.State," "RegForm.Zip," "RegForm.Phone," and so on.

The data provider application 248 may query the metadata service 230 (FIG. 2) and determine that metadata 224 (FIG. 2) is unavailable for the account registration form 303. In response, the data provider application 248 may render the auxiliary user interface 309, which facilitates creation of a mapping 115 (FIG. 1). In the non-limiting example of FIG. 3, the auxiliary user interface 309 includes a plurality of components corresponding to standardized data fields 312. Such standardized data fields 312 may include "First Name," "Middle Initial," "Last Name," "Birthdate," "Gender," "Age," and so on.

To create a mapping 115, a user may, for example, drag and drop "First Name" and "Last Name" from the standardized data fields 312 over to the name form field 306. The auxiliary user interface 309 may update based upon the dragging and dropping of multiple data items to allow the user to specify how the multiple data items are to be combined, transformed, etc. As a result, metadata 224 including a mapping 115 is created. The metadata 224 may be stored locally in the client 103 in the metadata cache 254 (FIG. 2). In one embodiment, the metadata 224 may be sent via the network 209 (FIG. 2) to the metadata management application 233 (FIG. 2). The metadata management application 233 may store the metadata 224 as metadata 224*b* (FIG. 2) or in the user-specified mappings 236 (FIG. 2). Depending on a configuration in the audit data 239, the user-specified mapping 236 may be verified or audited by one or more additional users before it is incorporated in the metadata 224*b* and generally distributed.

Figure 4A:
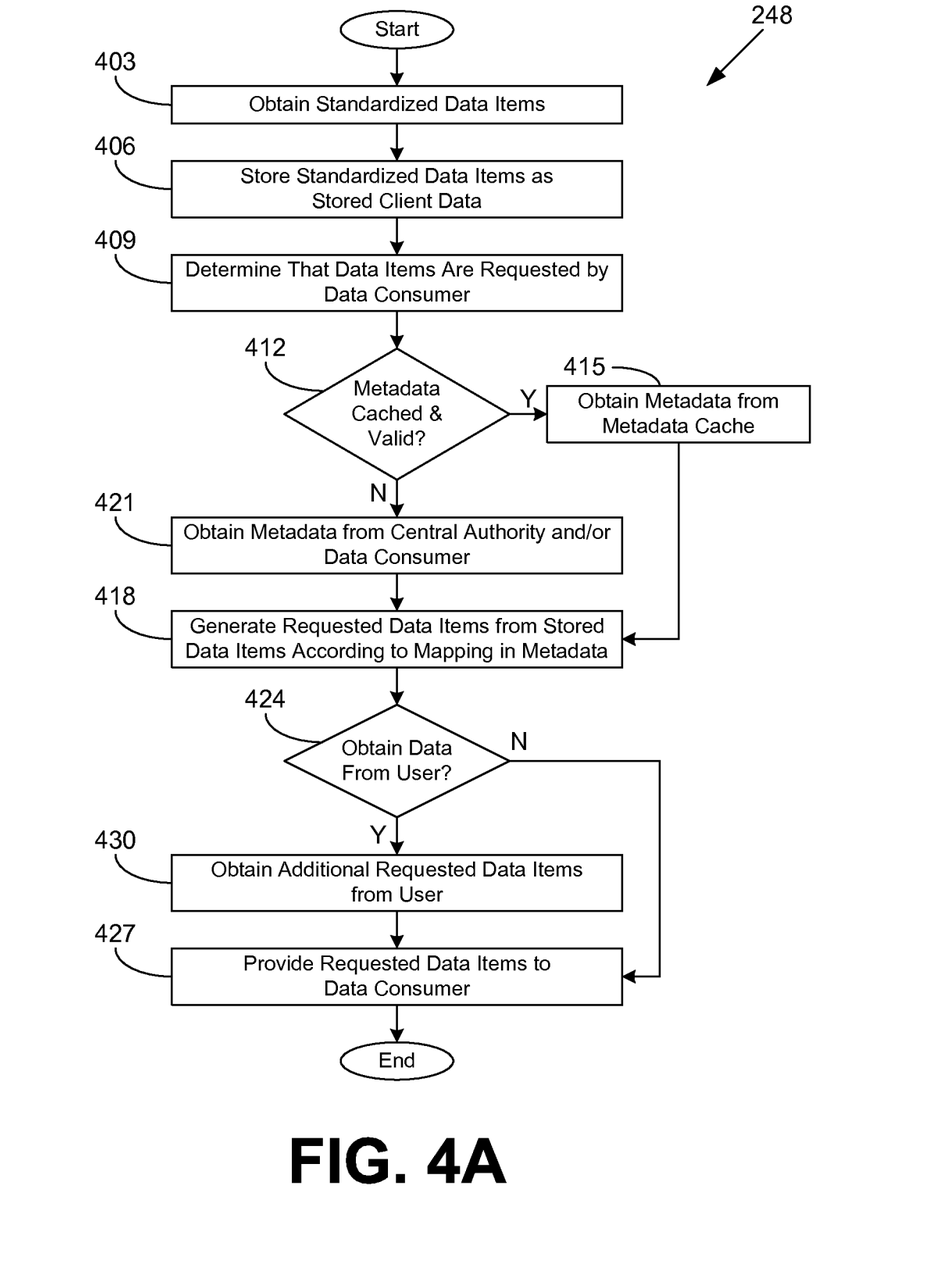
FIG. 4A is a flowchart illustrating one example of functionality implemented as portions of a data provider application executed in a client in the networked environment shown in FIG. 2 according to various embodiments of the present disclosure.

Referring next to FIG. 4A, shown is a flowchart that provides one example of the operation of a portion of the data provider application 248 according to various embodiments. It is understood that the flowchart of FIG. 4A provides merely an example of the many different types of functional arrangements that may be employed to implement the operation of the portion of the data provider application 248 as described herein. As an alternative, the flowchart of FIG. 4A may be viewed as depicting an example of steps of a method implemented in the client 103 (FIG. 2) according to one or more embodiments.

Beginning with box 403, the data provider application 248 obtains various standardized data items. The standardized data items may be obtained from a user via a user interface 112 (FIG. 2). For example, standardized data may be collected as part of an initial configuration procedure for the data provider application 248. Alternatively, the standardized data may be collected as the user fills out forms to provide data to various data consumers. In some cases, the standardized data items may be obtained from a network service that has access to at least some of the standardized data items for the user. The standardized data may correspond to standardized data types promulgated by the metadata central authority 109 (FIG. 1). In box 406, the data provider application 248 stores the standardized data items as the stored client data 118 (FIG. 1).

In box 409, the data provider application 248 determines that data items have been requested by a data consumer. As an example, a user may use the client application 245 (FIG. 1) to request a network page that includes a form. As another example, the client application 245 may be a mobile application that renders a form based at least in part upon network data. As yet another example, the client application 245 may locally generate a form to collect data from the user. In still other examples, a request for data items may be received by the data provider application 248 without a form being rendered on the display 242 (FIG. 2).

In box 412, the data provider application 248 determines whether metadata 224 (FIG. 2) for the data consumer has been locally cached and is valid. Cached metadata 224 may be invalid if it is outdated, corrupt, or otherwise unusable. If the metadata 224 has been locally cached and is valid, in box 415, the data provider application 248 obtains the metadata 224 for the data consumer from the metadata cache 254 (FIG. 2). The data provider application 248 then continues to box 418. If the metadata 224 has not been locally cached or is cached but is invalid, the data provider application 248 instead proceeds from box 412 to box 421.

In box 421, the data provider application 248 obtains the metadata 224 through an external source via the network 209 (FIG. 2). Such an external source may be a network data server 215 (FIG. 2) corresponding to a network site 218 (FIG. 2) and/or a metadata service 230 (FIG. 2) corresponding to a metadata central authority 109. The data provider application 248 may request the metadata 224 according to a domain name of a network site 218, a URL of a data consumer (e.g., a form on a network page, an endpoint of a data consumer service 217 (FIG. 2), etc.), a name or identifier of a form or other data consumer, and other identifiers. In some cases, the data provider application 248 may request the metadata 224 from multiple external sources. If metadata 224 is obtained from multiple sources, the data provider application 248 may be configured to resolve inconsistencies between multiple copies of metadata 224. For example, the data provider application 248 may be configured to prefer metadata 224 obtained from the network data server 215 over metadata 224 obtained from the metadata service, or vice versa. The data provider application 248 then proceeds to box 418.

In box 418, the data provider application 248 generates at least some of the requested data items based at least in part on the stored data items in the stored client data 118 and a mapping 115 (FIG. 1) in the metadata 224. The generation process may involve data transformations and combinations, and the data may be verified for compliance with regular expressions that define requested data formats in the mapping 115. In box 424, the data provider application 248 determines whether additional data is to be obtained from the user. For example, the data consumer may include data that has not yet been stored in the stored client data 118. Such data may simply be previously unrequested data or may be dynamic data such as CAPTCHA input data, a one-time password, a security question, etc. In various embodiments, the additional data may be characterized, according to the metadata 224 or the source form data, as being required or optional. In one embodiment, the data provider application 248 may be configured not to request optional data from the user. If additional data is not to be obtained from the user, the data provider application 248 proceeds to box 427.

If additional data is to be obtained (e.g., required data is to be obtained), the data provider application 248 instead proceeds from box 424 to box 430. In box 430, the data provider application 248 obtains the additional requested data items from the user. For example, the data provider application 248 may render a user interface 112 with a form that instructs the user to provide the additional requested data. Where the data is CAPTCHA data, such a user interface 112 may also render CAPTCHA images or audio for the user to interpret. The user interface 112 may be a pop-up window, a pop-over window, or other forms of user interfaces 112. The data provider application 248 continues to box 427.

In box 427, the data provider application 248 provides the requested data items to the data consumer. For example, the data provider application 248 may fill out a form and submit the form via HTTP "GET" or "POST" with the network data server 215. Alternatively, the data provider application 248 may make a service call to the data consumer service 217. As yet another alternative, the data provider application 248 may make an API call to a data consumer on the client 103. Thereafter, the portion of the data provider application 248 ends.

Figure 4B:
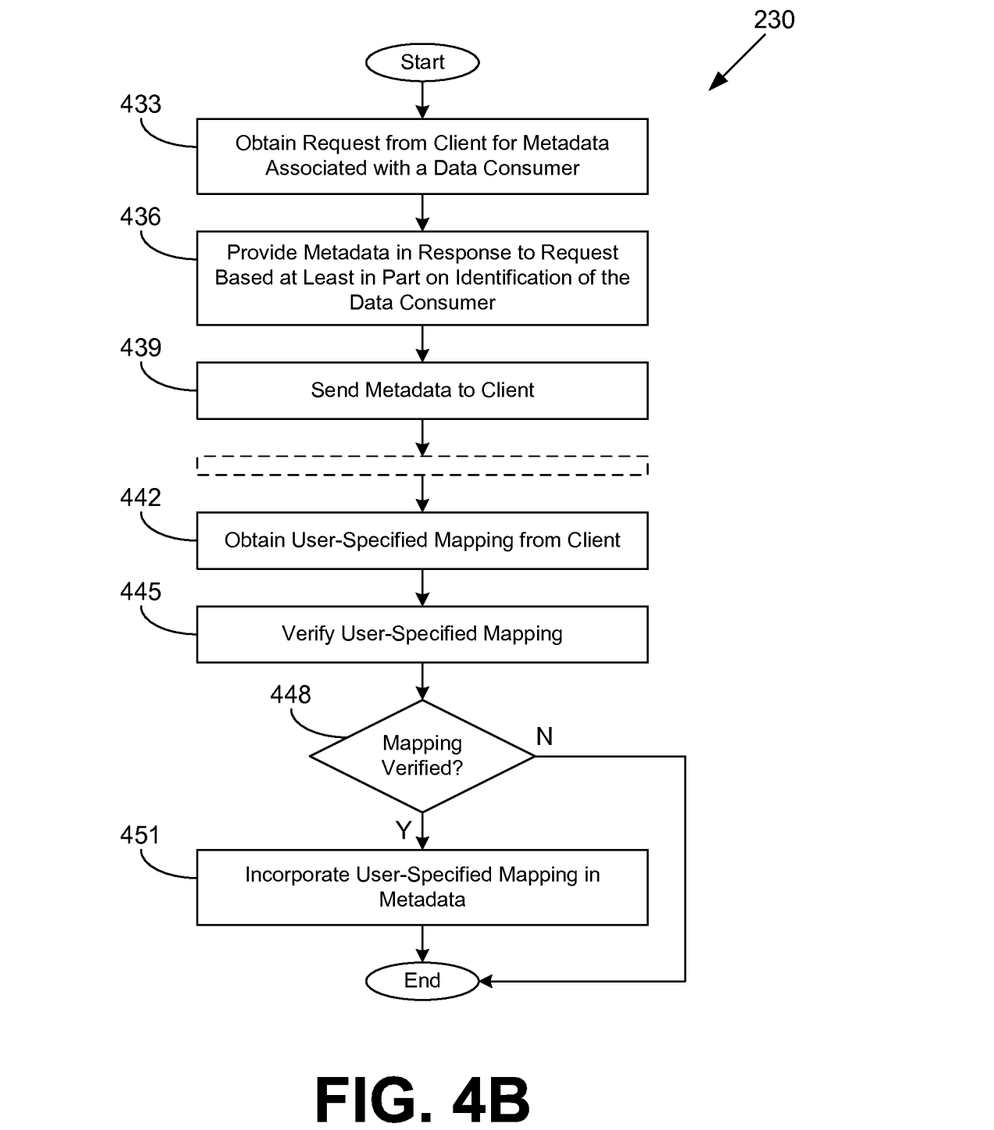
FIG. 4B is a flowchart illustrating one example of functionality implemented as portions of a metadata service executed in a computing environment in the networked environment shown in FIG. 2 according to various embodiments of the present disclosure.

Moving on to FIG. 4B, shown is a flowchart that provides one example of the operation of a portion of the metadata service 230 according to various embodiments. It is understood that the flowchart of FIG. 4B provides merely an example of the many different types of functional arrangements that may be employed to implement the operation of the portion of the metadata service 230 as described herein. As an alternative, the flowchart of FIG. 4B may be viewed as depicting an example of steps of a method implemented in the computing environment 206 (FIG. 2) according to one or more embodiments. Although described as relating to the metadata service 230, it is understood that one or more tasks described below may be performed by the metadata management application 233 (FIG. 2) in some embodiments.

Beginning with box 433, the metadata service 230 obtains a request from a client 103 (FIG. 1) for metadata 224b (FIG. 2) associated with a data consumer. In box 436, the metadata service 230 provides the metadata 224b in response to the request based at least in part on an identification of the data consumer. In box 439, the metadata service 230 sends the metadata 224b to the client 103. Various tasks may occur between boxes 439 and 442, and boxes subsequent to box 439 may be optional or may be performed in the metadata management application 233.

In box 442, the metadata service 230 obtains a user-specified mapping 236 (FIG. 2) from the client 103. In box 445, the metadata service 230 verifies the user-specified mapping 236. For example, the metadata service 230 may compare the user-specified mapping 236 with others submitted by other users to determine agreement or disagreement. Alternatively, an audit may be performed to determine whether the user-specified mapping 236 is correct.

In box 448, the metadata service 230 determines whether the user-specified mapping 236 has been verified. If the user-specified mapping 236 has not been verified, the portion of the metadata service 230 ends. If the user-specified mapping 236 has been verified, the metadata service 230 continues from box 448 to box 451 and incorporates the user-specified mapping 236 into the metadata 224b. Thereafter, the portion of the metadata service 230 ends.

Figure 5:
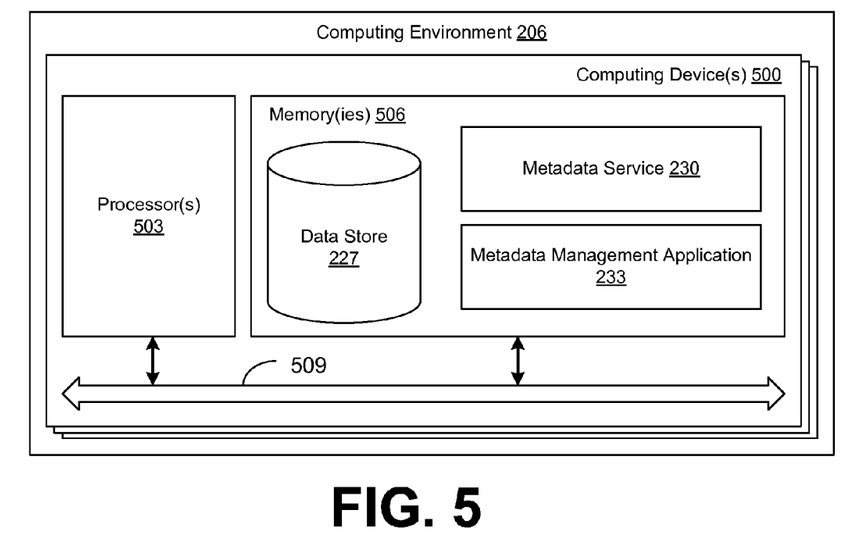
FIG. 5 is a schematic block diagram that provides one example illustration of a computing environment employed in the networked environment shown in FIG. 2 according to various embodiments of the present disclosure.

With reference to FIG. 5, shown is a schematic block diagram of the computing environment 206 according to an embodiment of the present disclosure. The computing environment 206 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated. It is understood that the computing environment 203 (FIG. 2) may be similar to the computing environment 206 and include computing devices 500.

Stored in the memory 506 are both data and several components that are executable by the processor 503. In particular, stored in the memory 506 and executable by the processor 503 are the metadata service 230, the metadata management application 233, and potentially other applications. Also stored in the memory 506 may be a data store 227 and other data. In addition, an operating system may be stored in the memory 506 and executable by the processor 503.

Figure 6:
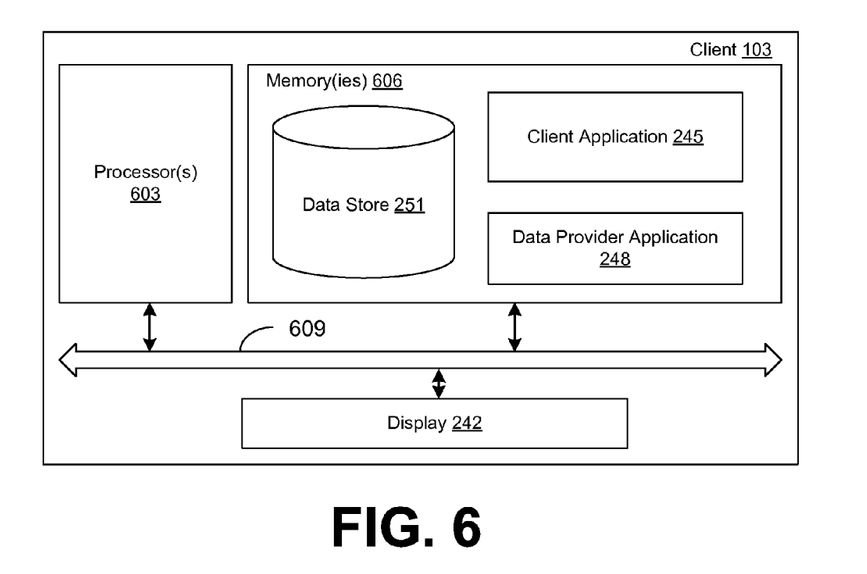
FIG. 6 is a schematic block diagram that provides one example illustration of a client employed in the networked environment shown in FIG. 2 according to various embodiments of the present disclosure.

Turning now to FIG. 6, shown is a schematic block diagram of the client 103 according to an embodiment of the present disclosure. The client 103 includes at least one processor circuit, for example, having a processor 603 and a memory 606, both of which are coupled to a local interface 609. The display 242 may also be coupled to the local interface 609.

The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the client application 245, the data provider application 248, and potentially other applications. Also stored in the memory 506 may be a data store 251 and other data. In addition, an operating system may be stored in the memory 606 and executable by the processor 603.

Referring now to both FIGS. 5 and 6, it is understood that there may be other applications that are stored in the memories 506, 606 and are executable by the processors 503, 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memories 506, 606 and are executable by the processors 503, 603. In this respect, the term "executable" means a program file that is in a form that can ultimately be run by the processors 503, 603. Examples of executable programs may be, for example, a compiled program that can be translated into machine code in a format that can be loaded into a random access portion of the memories 506, 606 and run by the processors 503, 603, source code that may be expressed in proper format such as object code that is capable of being loaded into a random access portion of the memories 506, 606 and executed by the processors 503, 603, or source code that may be interpreted by another executable program to generate instructions in a random access portion of the memories 506, 606 to be executed by the processors 503, 603, etc. An executable program may be stored in any portion or component of the memories 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 506, 606 are defined herein as including both volatile and nonvolatile memory and data storage components. Volatile components are those that do not retain data values upon loss of power. Nonvolatile components are those that retain data upon a loss of power. Thus, the memories 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 503, 603 may represent multiple processors 503, 603 and/or multiple processor cores and the memories 506, 606 may represent multiple memories 506, 606 that operate in parallel processing circuits, respectively.

In such a case, the local interfaces 509, 609 may be an appropriate network that facilitates communication between any two of the multiple processors 503, 603, between any of processors 503, 603 and any of the memories 506, 606, or between any two of the memories 506, 606, etc. The local interfaces 509, 609 may comprise additional systems designed to coordinate this communication, including, for example, performing load balancing. The processors 503, 603 may be of electrical or of some other available construction.

Although the metadata service 230, the metadata management application 233, the client application 245, the data provider application 248, the network data server 215 (FIG. 2), the data consumer service 217 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4A and 4B show the functionality and operation of an implementation of portions of the data provider application 248 and the metadata service 230. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503, 603 in a computer system or other system. The machine code may be converted from the source code, etc. If embodied in hardware, each block may represent a circuit or a number of interconnected circuits to implement the specified logical function(s).

Although the flowcharts of FIGS. 4A and 4B show a specific order of execution, it is understood that the order of execution may differ from that which is depicted. For example, the order of execution of two or more blocks may be scrambled relative to the order shown. Also, two or more blocks shown in succession in FIGS. 4A and 4B may be executed concurrently or with partial concurrence. Further, in some embodiments, one or more of the blocks shown in FIGS. 4A and 4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the metadata service 230, the metadata management application 233, the client application 245, the data provider application 248, the network data server 215, or the data consumer service 217, that comprises software or code can be embodied in any non-transitory computer-readable medium for use by or in connection with an instruction execution system such as, for example, a processor 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed by at least one computing device, causes the at least one computing device to at least:

in response to receiving a plurality of standardized data items from a user or a network service, store the plurality of standardized data items, wherein the plurality of standardized data items correspond to a plurality of preconfigured data fields;

determine that a plurality of data items are requested by a form in network content;

in response to receiving metadata that includes a mapping of the plurality of standardized data items to the plurality of data items that are requested, generate a first one of the plurality of data items that are requested by applying a transformation that is specified by the mapping to the one of the plurality of standardized data items, wherein the metadata is received from a central authority server via a network, the mapping is associated with an identification of the form and a domain name corresponding to the network content, and the mapping specifies a combination of at least two of the plurality of standardized data items;

generate a second one of the plurality of data items that are requested from the combination of the at least two of the plurality of standardized data items;

provide the plurality of data items that are requested to the form based at least in part on the mapping and the plurality of standardized data items;

determine that a particular data item of the plurality of data items that are requested does not correspond to any of the plurality of standardized data items according to the mapping; and render a user interface to elicit the particular data item from a user in response to determining that the particular data item does not correspond to the plurality of standardized data items according to the mapping.

2. The non-transitory computer-readable medium of claim 1, wherein the program further causes the at least one computing device to at least:
maintain a local cache of the metadata obtained from the central authority server;
determine whether the metadata is stored in the local cache and is valid; and
wherein the metadata is received from the local cache rather than the central authority server when the metadata is stored in the local cache and is valid.

3. The non-transitory computer-readable medium of claim 1, wherein the mapping includes a regular expression that defines an acceptable data format for at least one of the plurality of data items.

4. A system, comprising:
a data store; and
a client computing device in communication with the data store, the client computing device being configured to at least:
determine that a plurality of data items are requested by a data consumer;
in response to receiving metadata that includes a mapping of a plurality of stored data items to the plurality of data items that are requested, provide the plurality of data items that are requested to the data consumer based at least in part on the mapping and the plurality of stored data items, wherein the mapping is associated with an identification of the data consumer, and the plurality of stored data items correspond to a plurality of preconfigured data fields;
determine that a particular data item of the plurality of data items that are requested does not correspond to any of the plurality of stored data items according to the mapping; and
render a user interface to elicit the particular data item from a user in response to determining that the particular data item does not correspond to the plurality of stored data items according to the mapping.

5. The system of claim 4, wherein the data consumer corresponds to a form in a network page rendered by a browser executed in the client computing device, and the plurality of data items correspond to a plurality of fields of the form.

6. The system of claim 5, wherein the metadata is included in the network page.

7. The system of claim 4, wherein the data consumer corresponds to a form rendered by a mobile application executed in the client computing device, and the plurality of data items correspond to a plurality of fields of the form.

8. The system of claim 4, wherein the metadata is received from a server via a network, and the server is operated by a central authority unassociated with the data consumer.

9. The system of claim 8, wherein the plurality of preconfigured data fields correspond to a collection of data fields promulgated by the central authority.

10. The system of claim 4, wherein the particular data item corresponds to a challenge-response test input.

11. The system of claim 4, wherein the user interface is configured to elicit a user-specified mapping of one of the plurality of stored data items to the particular data item.

12. The system of claim 11, wherein the client computing device is further configured to send the user-specified mapping to a server via a network.

13. The system of claim 4, wherein the identification of the data consumer includes a domain name of the data consumer.

14. The system of claim 4, wherein the client computing device is further configured to apply a transformation that is specified by the mapping to the one of the plurality of stored data items to generate one of the plurality of data items that are requested.

15. The system of claim 14, wherein the transformation includes at least one of: a substring operation, an uppercase operation, a lowercase operation, or a replacement operation.

16. The system of claim 4, wherein the mapping specifies a combination of at least two of the plurality of stored data items, and the client computing device is further configured to generate one of the plurality of data items that are requested based at least in part on the combination of at least two of the plurality of stored data items.

17. A method, comprising:
receiving, via at least one of one or more computing devices, a request from a client for metadata associated with a data consumer, the request specifying an identification of the data consumer;
providing, via at least one of the one or more computing devices, the metadata in response to the request based at least in part on the identification of the data consumer, the metadata including a mapping of a plurality of standardized data items to a plurality of data items requested by the data consumer, wherein the plurality of standardized data items correspond to a plurality of preconfigured data fields;
sending, via at least one of the one or more computing devices, the metadata to the client;
determining, via at least one of the one or more computing devices, that a particular data item of the plurality of data items that are requested does not correspond to any of the plurality of standardized data items according to the mapping; and
generating, via at least one of the one or more computing devices, a user interface to elicit the particular data item from a user in response to determining that the particular data item does not correspond to the plurality of standardized data items according to the mapping.

18. The method of claim 17, wherein the data consumer corresponds to a web form on a network page, and the plurality of data items requested by the data consumer correspond to a plurality of form fields.

19. The method of claim 17, further comprising:
receiving, via at least one of the one or more computing devices, a user-specified mapping of one of the plurality of standardized data items to one of the plurality of data items requested by the data consumer; and
incorporating, via at least one of the one or more computing devices, the user-specified mapping in the metadata.

20. The method of claim 17, further comprising:
receiving, via at least one of the one or more computing devices, a plurality of user-specified mappings of the plurality of standardized data items and the plurality of data items requested by the data consumer from a plurality of clients; and
verifying, via at least one of the one or more computing devices, the plurality of user-specified mappings before incorporating the plurality of user-specified mappings in the metadata.

21. The method of claim 20, wherein verifying further comprises determining, via at least one of the one or more computing devices, whether a first one of the plurality of user-specified mappings agrees with a second one of the plurality of user-specified mappings.

22. The method of claim 17, wherein the plurality of standardized data items are standardized by a central authority and the one or more computing devices are associated with the central authority.

23. The method of claim 17, wherein the mapping is associated with an identification of a domain name corresponding to the client.

\* \* \* \* \*